United States Patent [19]

Pancotti

[11] Patent Number: 5,165,853
[45] Date of Patent: Nov. 24, 1992

[54] MAIN HELICOPTER ROTOR

[75] Inventor: Santino Pancotti, via Buozzi, Italy

[73] Assignee: Agusta S.P.A., Frazione Cascina Costa, Italy

[21] Appl. No.: 681,137

[22] Filed: Apr. 5, 1991

[30] Foreign Application Priority Data

Apr. 6, 1990 [IT] Italy .................. 67262 A/90

[51] Int. Cl.$^5$ .................................................. B63H 1/06
[52] U.S. Cl. ............................ 416/134 A; 416/140; 416/141; 416/244 R; 416/500
[58] Field of Search .............. 416/134 A, 141, 140, 416/244 R, 131, 244 C, 244 D, 500

[56] References Cited

U.S. PATENT DOCUMENTS

| | | | |
|---|---|---|---|
| 3,700,352 | 10/1972 | Gorndt | 416/134 A X |
| 4,203,709 | 5/1980 | Watson | 416/141 X |
| 4,281,966 | 8/1981 | Duret et al. | 416/136 X |
| 4,297,078 | 10/1981 | Martin | 416/134 A |
| 4,306,836 | 12/1981 | Materjak | 416/134 A |
| 4,323,332 | 4/1982 | Fradenburgh | 416/102 X |
| 4,352,632 | 10/1982 | Schwarz et al. | 416/134 A |
| 4,361,415 | 11/1982 | Aubry | 416/140 A X |
| 4,566,856 | 1/1986 | Miller | 416/140 A X |

FOREIGN PATENT DOCUMENTS

| | | | |
|---|---|---|---|
| 653402 | 11/1937 | Fed. Rep. of Germany | 416/140 A |
| 642206 | 7/1962 | Italy | 416/134 A |

Primary Examiner—Edward K. Look
Assistant Examiner—Todd Mattingly
Attorney, Agent, or Firm—Kane, Dalsimer, Sullivan, Kurucz, Levy, Eisele and Richard

[57] ABSTRACT

A main helicopter rotor has a number of blades and drive shaft that supports, at its top end, a hub defined by a rocking toroidal body, the inner and outer edges of which are connected to the drive shaft via respective spherical elastomeric joints having a common center on the axis of the drive shaft. The toroidal body is fitted with and supports a rigid tubular body substantially coaxial with the drive shaft. Each blade is connected to the hub by a connecting element extending through both the tubular body and the toroidal body and connected respectively to the same by a first and second elastomeric bearing.

11 Claims, 2 Drawing Sheets 5,165,853

MAIN HELICOPTER ROTOR

BACKGROUND OF THE INVENTION

The present invention relates to a main helicopter rotor.

In particular, the present invention relates to a rotor of the type comprising a drive shaft designed to turn about is axis; a hub; first connecting means between the drive shaft and hub, for rotating the hub together with the drive shaft about said axis, and enabling the hub to rock about a point along said axis; a number of blades extending substantially radially outwards from the hub and each comprising a connecting device for connection to the hub; a pitch change device connected to said connecting devices; and second means for connecting each said connecting device to the hub.

Known rotors of the aforementioned type are generally referred to as "spherical" rotors.

In the case of a spherical rotor, said first connecting means must be designed to enable torque transmission between the drive shaft and hub; to transmit lift and shear in the rotor plane to the drive shaft, and simultaneously enable the hub to rock about a point along the drive shaft axis, while at the same time generating an appropriate control moment; and to ensure homokinetic transmission between the drive shaft and hub regardless of the rocking position of the hub in relation to the drive shaft.

On known spherical rotors, the above somewhat conflicting requirements are at least partially met by employing a large number of dedicated components. For example, lift and shear transmission between the hub and drive shaft and the rocking movement of the hub in relation to the drive shaft are usually made possible by connecting the hub to the drive shaft via a central spherical joint. Torque, on the other hand, is transmitted by means of links and/or a membrane which, despite also providing for generating the control moments and ensuring homokinetic transmission, is incapable of supporting the blades when the rotor is idle, thus requiring the use of mobile supporting members of the type normally employed on articulated rotors.

In other words, known spherical rotors may safely be said to present a highly complex structure, in terms of both mechanical design and operation, thus resulting in serious drawbacks in terms of cost and safety.

SUMMARY OF THE INVENTION

The aim of the present invention is to provide a rotor of the aforementioned type having an extremely straight-forward, compact structure and which is relatively cheap to produce.

A further aim of the present invention is to provide a rotor of the aforementioned type enabling the elimination of members such as said links and said mobile members for supporting the blades when the rotor is idle. With this aim in view, according to the present invention, there is provided a rotor of the aforementioned type, characterised by the fact that said hub comprises a toroidal body and a tubular body substantially coaxial with each other and with said drive shaft; said first connecting means being locating between said toroidal body and said drive shaft, for enabling said toroidal body to rock about said point along said axis; said tubular body being connected to and supported by said toroidal body; and said second connecting means comprising a first elastomeric bearing located between a respective said connecting device and said tubular body and defining a focal point for a respective said blade, and a second elastomeric bearing located between each said connecting device and said toroidal body.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Number 1 in the accompanying drawings indicates a main rotor of a helicopter (not shown). Rotor 1 comprises a tubular drive shaft 2 extending substantially vertically and connected angularly at the bottom end to the output of a reduction gear casing (not shown) in turn connected to the output of the helicopter drive (not shown).

Figure 1:
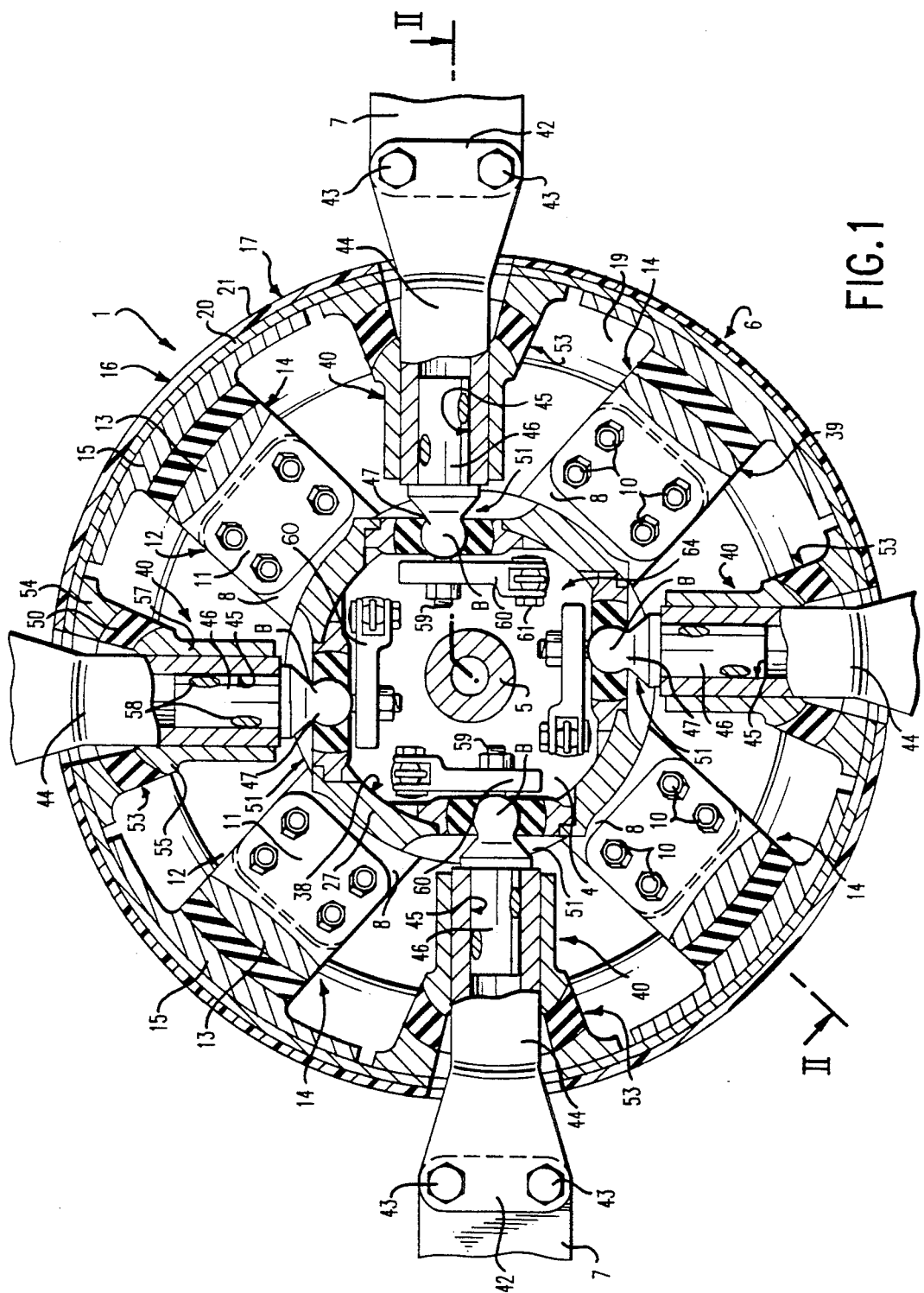
FIG. 1 shows a cross section, with parts removed for simplicity, of a preferred embodiment of the helicopter rotor according to the present invention.
Figure 2:
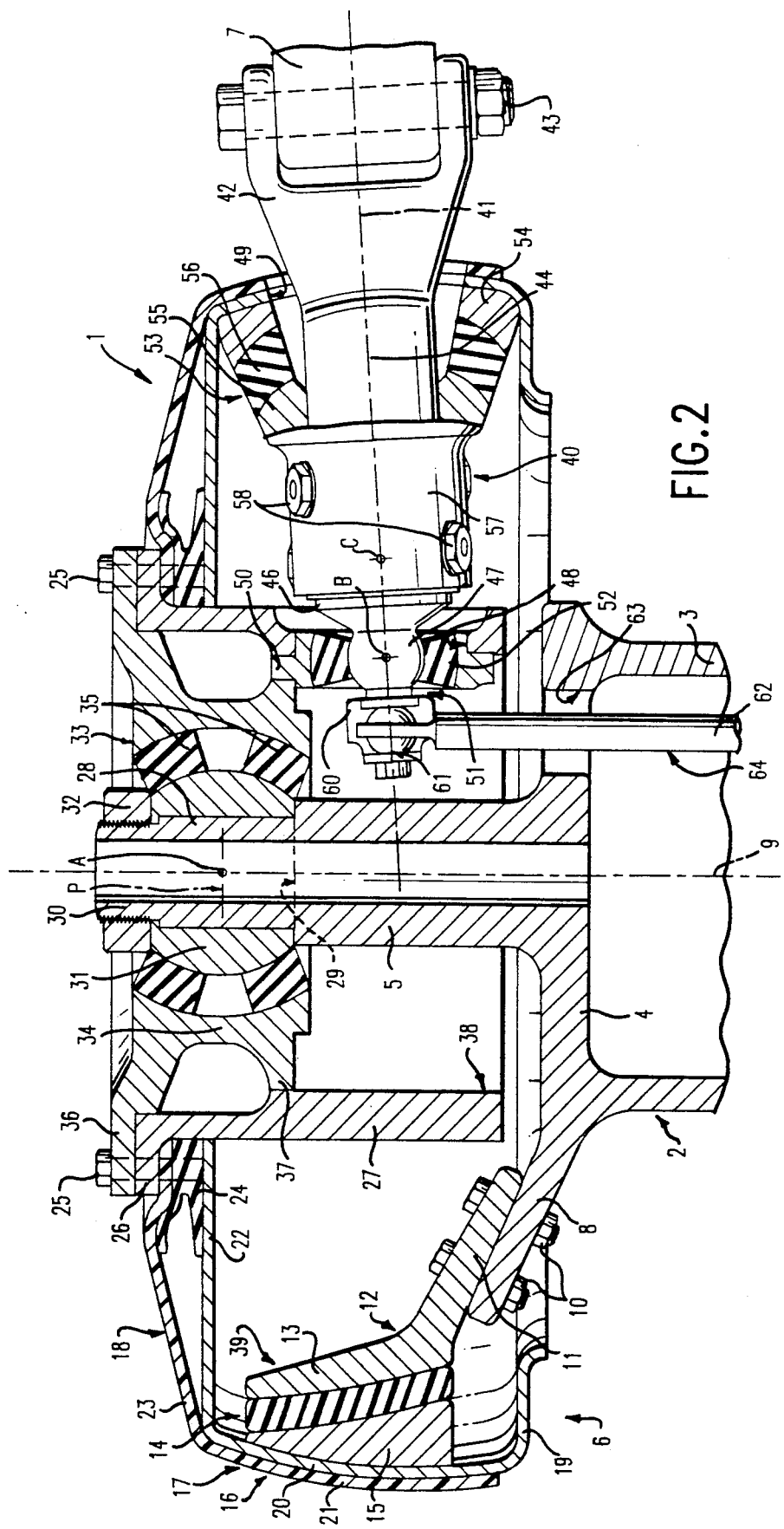
FIG. 2 shows a section along line II—II in FIG. 1.

As shown in FIG. 2, shaft 2 comprises, at the top, a first portion 3 closed at the top by a flat transverse wall 4; and a second smaller-diameter portion 5 consisting of a tubular appendix extending upwards from a central portion of wall 4 and coaxial with portion 3. Portions 3 and 5 of shaft 2 are connected to a hub 6 for connecting to shaft 2 a number of blades 7 extending substantially radially outwards from hub 6.

In particular, portion 3 of shaft 2 is connected to hub 6 by means of a number of flat plates 8 sloping slightly upwards and extending outwards from the outer periphery of wall 4 along a conical surface the axis of which coincides with axis 9 of shaft 2.

Plates 8 are equally spaced about shaft 2, are equal in number to blades 7, and are each fitted, on the upper surface and via bolts 10, with an arm 11 of a respective substantially L-shaped bracket 12, the second arm 13 of which extends outwards of the outer radial end of respective plate 8 and upwards substantially parallel to axis 9.

Arm 13 constitutes the inner shoe of a respective spherical elastomeric bearing 14, the center "A" of which coincides with the centers of the other bearings 14, and is located on axis 9 and substantially in the plane (P) defined by the centers of gravity (not shown) of blades 7 when these move on to the so-called stabilized hovering precone.

The outer shoe of each elastomeric bearing 14 consists of a curved element 15 integral with the inner surface of an intermediate annular portion 16 of a toroidal body 17 preferably made of composite synthetic material and extending about shaft 2 substantially coaxial with axis 9.

As shown in FIG. 2, toroidal body 17 presents a substantially C-shaped section with its concave side facing axis 9, and, in addition to annular portion 16, comprises two annular flanges 18 and 19 extending inwards from the top and bottom ends of intermediate portion 16 and over and beneath bearings 14 respectively.

Both annular portion 16 and upper flange 18 are double-walled, annular portion 16 comprising an inner wall 20 and outer wall 21 contacting each other, and upper flange 18 comprising an inner wall 22 blending with wall 20, and an outer wall 23 diverging from wall 22 and blending with wall 21. The inner edges of walls 22 and 23 of flange 18 are rendered mutually integral via the interposition of a ring 24 coaxial with axis 9 and made of composite synthetic material.

As shown particularly in FIG. 2, flange 18 is connected, by screws 25 and at ring 24, to the bottom surface of an annular flange 26 extending outwards from the top end of a rigid tubular body 27 preferably made of metal and connected to flange 18 substantially coaxial with axis 9.

Tubular body 27 is connected to toroidal body 17 over wall 4, and is fitted through with tubular appendix 5, which comprises a small-diameter upper portion 28 blending with the bottom portion of appendix 5 via an annular shoulder 29, and terminating at the top in a threaded portion 30. Portion 28 of appendix 5 engages a diametrical through hole in a spherical ball 31 having its center at "A" and locked axially against shoulder 29 by a ring nut 32 on threaded portion 30.

Ball 31 constitutes the inner shoe of an elastomeric joint indicated as a whole by 33 and comprising an outer annular shoe 34 connected to the inner shoe via the interposition of two rings 35 of elastomeric material, and having, at opposite ends, an upper annular flange 36 and lower annular flange 37. The outer edge of flange 36 extends over flange 26 of tubular body 27, and is secured to flange 26 by screws 25. At least part of the outer edge of flange 37 is arranged contacting the inner cylindrical surface 38 of tubular body 27, so as to render body 27 integral with outer shoe 34 and enable it to move together with shoe 34 about point "A".

Toroidal body 17 and tubular body 27 are thus connected elastically to the top of shaft 2 so as to rock about point "A", thanks to the presence, between toroidal body 17 and tubular body 27 on the one hand and shaft 2 on the other, of spherical elastomeric joint 33 having its center at "A" and located between the inner edge of toroidal body 17 and shaft 2, and a further spherical elastomeric joint 39 having its center at "A" and defined by elastomeric bearings 14.

In particular, elastomeric joint 39 is located between shaft 2 and the outer edge of toroidal body 17, and presents an inner spherical ball defined by arms 13, the surfaces of which extend along a spherical ring coaxial with axis 9 and located beneath point "A" so as to enable joint 39 to transmit lift between hub 6 and shaft 2.

The inner end of each blade 7 is connected to tubular body 27 by a connecting element 40 extending substantially radially in relation to tubular body 27 and along a respective axis 41 coinciding with the axis of respective blade 7. Each connecting element 40 comprises, on the outer end, a fork, 42 connected to the inner end of respective blade 7 by two bolts 43 substantially parallel to axis 9, and, on the inner end, a rod 44 integral with fork 42 and having an axial hole 45 engaged by a cylindrical rod 46 projecting from hole 45 towards axis 9 and terminating in a spherical head 47 having its center "B" on axis 41.

Each connecting element 40 engages a substantially radial hole 48 formed through tubular body 27, between a respective pair of adjacent plates 8; and a substantially radial hole 49 formed through annular portion 16 of toroidal body 17, between a respective pair of curved elements 15.

Each hole 48 is engaged by the outer shoe 50 of a respective spherical elastomeric bearing 51, the inner shoe of which is defined by respective spherical head 47 connected to respective outer shoe 50 via a layer 52 of reinforced elastomeric material.

Each connecting element 40 is secured to toroidal body 17 by a further spherical (or conical) elastomeric bearing 53 mounted with its concave side facing axis 9. Each bearing 53 presents its center (or vertex) "C" on respective axis 41, inside toroidal body 17, and comprises an annular outer shoe 54 connected integral with annular portion 16 and coaxial with respective hole 49; and an annular inner shoe 55 coaxial with respective axis 41 and connected to outer shoe 54 by an annular layer 56 of reinforced elastomeric material. Inner shoe 55 is integral with the end of a coupling 57 fitted on to respective rod 44 and fitted through with two diametrical bolts 58 perpendicular to each other and offset axially along coupling 57 for rendering coupling 57, respective rod 44 and respective rod 46 integral with one another.

On the opposite side to respective rod 46 and coaxially with the same, each head 47 is fitted with a pin 59 located inside shaft 2 and fitted with a respective fork 60 extending radially outwards from respective pin 59 and to which the top end of a rod 62 is hinged via a spherical joint 61. Rods 62 are control rods extending along shaft 2 and through respective holes 63 in wall 4, and constitute the output members of a known internal-transmission pitch change device 64.

Needless to say, by making minor alterations within the capacity of any technician in this particular field, said "internal-transmission" pitch change device may easily be replaced with a commonly known so-called "external-transmission" pitch change device (not shown). Some mention should be made, however, concerning certain structural details and operating characteristics of the connection between blades 7 and hub 6 and connection of hub 6 to drive shaft 2.

The foremost structural characteristic of rotor 1 as described consists of toroidal body 17, which provides for connecting tubular body 27 and achieving an extremely compact, aerodynamically "clean" rotor.

Elastomeric joints 33 and 39, in fact, provide for guiding toroidal body 17 along a spherical surface having its center at "A", as it travels in relation to shaft 2. Consequently, under normal flight conditions, toroidal body 17 tends to be located in the plane of rotor 1, thus offsetting axes 41 of opposite pairs of blades 7 by a relatively small amount (measured along axis 9) and resulting in relatively small control moments, which are brought back to acceptable values by the reaction moments introduced by elastomeric joint 33 and, particularly, elastomeric joint 39, which also provides for transmitting large part of the torque and lift between hub 6 and drive shaft 2.

As already state, toroidal body 17 tends to be located in the plane of the rotor, i.e. in the so-called rotation reference plane, and also provides for interconnecting all of blades 7. Consequently, the shear and circumferential stress transmitted to toroidal body 17 by each blade are generally at least partially compensated by the corresponding stress transmitted by the other blades. Blades 7 therefore effect relatively small flapping and lead-lag movements, so that dampers are not necessarily required in the rotor plane.

Moreover, by virtue of the limited lead-lag movement of the blades, rotor 1 as described involves substantially no ground resonance problems, and therefore requires no mobile blade supporting devices in that elastomeric bearings 53 are more than sufficient for supporting the blades when the rotor is idle.

In connection with the above, it should be pointed out that, as already state, elastomeric bearings 53 may be either spherical or conical, both forms providing in substantially equal measure for performing the function required of bearings 53, i.e. that of transmitting to toroidal body 17 the centrifugal forces generated by respective blades 7.

I claim:

1. A main helicopter rotor of the type comprising a drive shaft (2) designed to turn about its axis (9); a hub (6); first connecting means (33, 39) between the drive shaft (2) and hub (6), for rotating the hub (6) together with the drive shaft (2) about said axis (9), and enabling the hub (6) to rock about a point (A) along said axis; a number of blades (7) extending substantially radially outwards from the hub (6) and each comprising a connecting device (40) for connection to the hub (6); a pitch change device (64) connected to said connecting devices (40); and second means (51, 53) for connecting each said connecting device (40) to the hub (6); characterized by the fact that said hub (6) comprises a toroidal body (17) and a tubular body (27) substantially coaxial with each other and with said drive shaft (2); said first connecting means (33, 39) being located between said toroidal body (17) and said drive shaft (2), and being spherical connecting means for enabling said toroidal body (17) to rock about said point (A) along said axis (9); said tubular body (27) being connected to and supported by said toroidal body (17); and said second connecting means (51, 53) comprising a first deformable bearing (51) located between a respective said connecting device (40) and said tubular body (27) and defining a focal point for a respective said blade (7), and a second deformable bearing (53) located between each said connecting device (40) and said toroidal body (17).

2. A rotor as claimed in claim 1, characterised by the fact that said toroidal body (17) presents a substantially C-shaped section with its concave side facing said axis (9), and comprises an intermediate, substantially cylindrical, annular portion (16), and a first and second annular flange (18, 19) extending substantially radially inwards from the top and bottom end respectively of said intermediate annular portion (16).

3. A main helicopter rotor of the type comprising a drive shaft (2) designed to turn about its axis (9); a hub (6); first connecting means (33, 39) between the drive shaft (2) and hub (6), for rotating the hub (6) together with the drive shaft (2) about said axis (9), and enabling the hub (6) to rock about a point (A) along said axis; a number of blades (7) extending substantially radially outwards from the hub (6) and each comprising a connecting device (40) for connection to the hub (6); a pitch change device (64) connected to said connecting devices (40); and second means (51, 53) for connecting each said connecting device (40) to the hub (6); characterized by the fact that said hub (6) comprises a toroidal body (17) and a tubular body (27) substantially coaxial with each other and with said drive shaft (2); said first connecting means (33, 39) being located between said toroidal body (17) and said drive shaft (2), for enabling said toroidal body (17) to rock about said point (A) along said axis (9); said tubular body (27) being connected to and supported by said toroidal body (17); and said second connecting means (51, 53) comprising a first deformable bearing (51) located between a respective said connecting device (40) and said tubular body (27) and defining a focal point for a respective said blade (7), and a second deformable bearing (53) located between each said connecting device (40) and said toroidal body (17), said toroidal body (17) presenting a substantially C-shaped section with its concave side facing said axis (9), and comprising an intermediate, substantially cylindrical, annular portion (16), and a first and second annular flange (18, 19) extending substantially radially inwards from the top and bottom end respectively of said intermediate annular portion (16), said first connecting means (33, 39) comprising a first (33) and second (39) spherical deformable joint, the centers of which coincide with said point (A) on said axis (9).

4. A rotor as claimed in claim 3, characterised by the fact that said first spherical deformable joint (33) is located between the inner edge of said first flange (18) and a first portion (5) of said drive shaft (2), and comprises a spherical ball (31) integral with said drive shaft (2) and having its center at said point (A).

5. A rotor as claimed in claim 3, characterised by the fact that said second spherical deformable joint (39) is located between said intermediate annular portion (16) of said toroidal body (17) and a second portion (3) of said drive shaft (2); said second portion (3) being located below said first portion (5), and said second deformable joint (39) comprising an inner ball (13) the surface of which extends along at least part of a spherical segment having its center at said point (A) on said axis (9) and located beneath said point (A).

6. A rotor as claimed in claim 3, characterised by the fact that said second spherical deformable joint (39) comprises a number of further spherical deformable bearings (14) equally spaced about said axis (9) and having respective centers coinciding with one another and with said point (A) on said axis (9); said further spherical deformable bearings (14) being equal in number to said blades (7).

7. A rotor as claimed in claim 6, characterised by the fact that the top end (26) of said tubular body (27) is connected to an inner peripheral portion of said first flange (18); said tubular body (27) being connected to said first flange (18) facing said intermediate annular portion (16).

8. A rotor as claimed in claim 1, characterised by the fact that each said first deformable bearing (51) is spherical.

9. A rotor as claimed in claim 1, characterised by the fact that each said second deformable bearing (53) is spherical and mounted with its concave side facing said drive shaft (2).

10. A rotor as claimed in claim 1, characterised by the fact that each said second deformable bearing (53) is conical and mounted with its concave side facing said drive shaft (2).

11. A rotor as claimed in claim 1, characterised by the fact that said point (A) on said axis (9) is substantially located in a plane (P) defined by the centers of gravity of said blades (7) when said blades (7) move on to the stabilized hovering precone.

* * * * *